(12) United States Patent
Kalyanaraman et al.

(10) Patent No.: US 9,573,480 B2
(45) Date of Patent: Feb. 21, 2017

(54) BATTERY OPTIMIZATION

(71) Applicant: International Business Machines Corporation, Armonk, NY (US)

(72) Inventors: Shivkumar Kalyanaraman, Carlton (AU); Jan Valentin Muenzel, Elwood (AU); Arun Vishwanath, Blackburn (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/661,527

(22) Filed: Mar. 18, 2015

(65) Prior Publication Data

US 2016/0272078 A1   Sep. 22, 2016

(51) Int. Cl.
*H01M 10/44*   (2006.01)
*B60L 11/18*   (2006.01)
*G01C 21/36*   (2006.01)

(52) U.S. Cl.
CPC ........ *B60L 11/1822* (2013.01); *B60L 11/1864* (2013.01); *G01C 21/3691* (2013.01)

(58) Field of Classification Search
CPC ................... G06F 3/0412; G06F 3/147; B60K 2001/0455; H01M 2/1077; H01M 10/625; H02J 7/0027; Y02T 10/7055; Y02T 10/705; Y02T 90/14; Y02T 10/7088; Y02T 10/72; Y02T 10/7291; Y02T 90/161; Y02T 90/162; Y02T 90/169

(Continued)

(56) References Cited

U.S. PATENT DOCUMENTS

| 5,534,366 A | 7/1996 | Hwang et al. |
| 5,815,824 A * | 9/1998 | Saga ................. B60K 6/46 |
| | | 180/65.245 |
| 6,027,828 A | 2/2000 | Hahn |

(Continued)

FOREIGN PATENT DOCUMENTS

WO   2012178205 A3   12/2012

OTHER PUBLICATIONS

Xing et al., "Battery Management Systems in Electric and Hybrid Vehicles", Energies 2011, 4, doi:10.3390/en4111840, pp. 1840-1857.

(Continued)

*Primary Examiner* — Dalena Tran
(74) *Attorney, Agent, or Firm* — Kristofer L. Haggerty

(57) ABSTRACT

Embodiments of the present invention disclose a method, system, and computer program product for battery optimization. A computer receives the driving schedule of an electric vehicle detailing the dates and times electric vehicle will be driven as well as the locations the driver is driving to and from. The computer identifies several potential routes between locations and retrieves trip data detailing information relevant to commuting the potential routes. The computer determines the optimal route the driver should take as well as the minimum number of rechargeable battery packs necessary to power the electric car to the destinations and back. The computer also determines the optimal configuration of those batteries to maximize vehicle handling. The computer transmits both the minimum number of necessary batteries and the configuration thereof to a battery exchanger located under the parking spot of the vehicle which charges and exchanges battery packs to/from the electric vehicle.

15 Claims, 3 Drawing Sheets

(58) Field of Classification Search
USPC ... 701/22; 320/109, 104, 112, 138; 180/68.5
See application file for complete search history.

(56) References Cited

U.S. PATENT DOCUMENTS

| | | |
|---|---|---|
| 7,960,943 B2 | 6/2011 | Gamboa et al. |
| 8,227,103 B2 | 7/2012 | Tsukamoto |
| 8,237,400 B2 | 8/2012 | Gamboa et al. |
| 8,386,102 B2 | 2/2013 | Gullichsen |
| 8,400,012 B2 | 3/2013 | Weidenheimer et al. |
| 9,123,035 B2 * | 9/2015 | Penilla .................. G06Q 20/18 |
| 9,221,355 B2 * | 12/2015 | Kuhn .................. B60L 11/1861 |
| 2009/0058355 A1 | 3/2009 | Meyer |
| 2010/0094496 A1 * | 4/2010 | Hershkovitz ............ B60L 3/12 |
| | | 701/22 |
| 2010/0181129 A1 | 7/2010 | Hamidi |
| 2012/0299531 A1 | 11/2012 | Prosser et al. |
| 2014/0171260 A1 | 6/2014 | Dalum |

OTHER PUBLICATIONS

Kaschub et al., "Feasibility of Battery Switch Stations for Local Emission Free Public Transport", Enerday 2012, 7th Conference on Energy Economics and Technology, Dresden, Germany, 2012, pp. 1-14.

Tesla Motors Inc, "Form 10K (annual report)", Filed Mar. 7, 2013 for the Period Ending Dec. 31, 2012, Palo Alto, CA, Fiscal Year Dec. 31, 172 pages.

Charbiwala et al., "Intelligent Composable Multi-Function Battery Pack", U.S. Appl. No. 14/501,978, filed Sep. 30, 2014, 25 pages.

\* cited by examiner

BATTERY OPTIMIZATION

TECHNICAL FIELD

The present invention relates generally to battery management, and more particularly to the division of battery packs to improve electric vehicle performance.

BACKGROUND

Rechargeable battery packs are frequently used in electric vehicles, or EV's. While EV manufacturers aim to maximize the range on a single charge, it is rare for a driver to utilize the entire, or even a substantial portion of, the maximum range of a battery pack. Consequently, EV drivers are transporting hundreds of pounds of overprovisioned and underutilized battery packs that are effectively dead weight. This dead weight negatively impacts EV performance by decreasing efficiency, acceleration, and handling while increasing stopping distance.

SUMMARY

Embodiments of the present invention disclose a method, system, and computer program product for battery optimization. A computer receives the driving schedule of the driver of an electric vehicle. The driving schedule details the dates and times the driver is driving the electric vehicle as well as the locations the driver is driving to and from. Based on the driving schedule, the computer identifies several potential routes between destinations and retrieves trip data detailing information relevant to commuting the potential routes (such as mileage, delays, and weather conditions). Based on the trip data, the computer determines the optimal route the driver should take as well as the minimum number of rechargeable battery packs necessary to power the electric car to the destinations and back. The computer also determines the optimal configuration of those batteries within the electric vehicle to maximize vehicle handling. The computer then transmits both the minimum number of battery packs and the configuration thereof to a battery exchanger located under the parking spot of the vehicle which charges and exchanges the battery packs to and from the electric vehicle.

DETAILED DESCRIPTION

Embodiments of the present invention will now be described in detail with reference to the accompanying figures.

Figure 1:
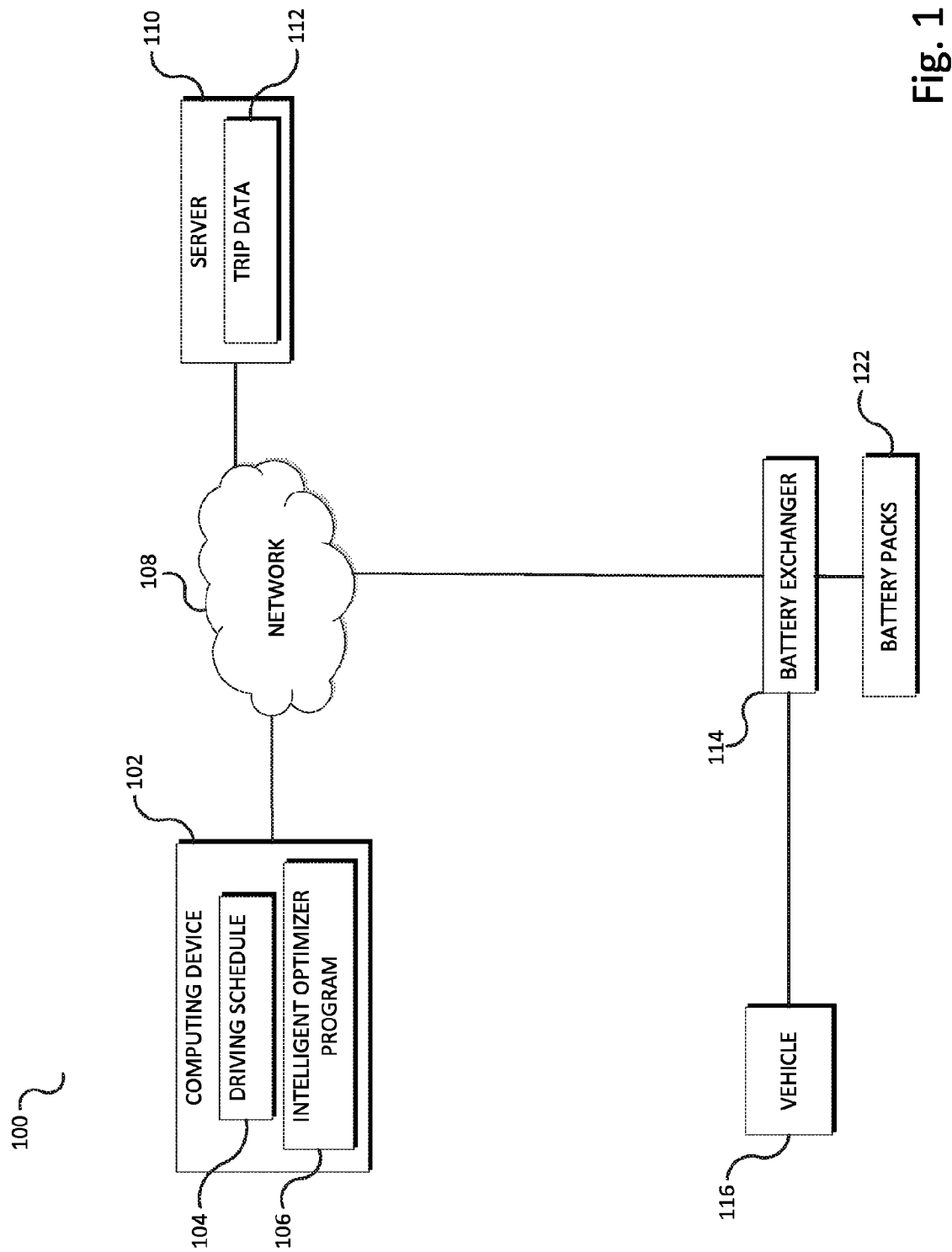
FIG. 1 illustrates a battery optimization system, in accordance with an embodiment of the invention.

FIG. 1 illustrates a battery optimization system 100, in accordance with an embodiment of the invention. In the example embodiment, battery optimization via physical division system 100 includes computing device 102, network 108, server 110, vehicle 116, battery exchanger 114, and battery packs 122.

In the example embodiment, network 108 is the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between server 110, computing device 102, and battery exchanger 114.

Vehicle 116 is an automobile capable of operating on electric power. In the example embodiment, electric vehicle 116 is powered solely by rechargeable and exchangeable battery packs 122, however in other embodiments, electric vehicle 116 may be a hybrid vehicle.

Battery exchanger 114 is an automated and robotic system capable of adding, removing, and exchanging battery packs 122 to and from vehicle 116. Battery exchanger 114 is additionally capable of monitoring charge level, charging, and storing battery packs 122 as well as allocating battery packs 122 to alternative applications such as storing solar energy or running household appliances. Furthermore, battery exchanger 114 is capable of communicating with other devices, such as receiving and transmitting information to/from intelligent optimizer program 106 via network 108. In the example embodiment, battery exchanger 114 is located underground in a location that is directly beneath the parking spot of vehicle 116, such as within the garage or driveway of the user. In the example embodiment, battery exchanger 114 is positioned such that vehicle 116 can be parked above it, allowing battery exchanger 114 to exchange battery packs 122 through the underside of vehicle 116.

In the example embodiment, battery packs 122 consist of multiple, low profile, plate-shaped battery packs designed to maximize potential configurations in optimizing the center of gravity and handling of vehicle 116. Each of battery packs 122 contains a string of cells configured in series and/or in parallel and is capable of connectivity with adjacent battery packs via an internal DC-DC converter comprising of an inductor, a diode, and a transistor. In the example embodiment, the internal DC-DC converter allows battery packs of different charges to be wired in parallel despite differing voltages. In the example embodiment, battery packs 122 are protected from damage using a permanent, top mounted protective cover and a removable bottom mounted protective cover to enclose rechargeable battery packs 122 from the top and bottom. In other embodiments, battery packs 122 may be protected from damage in various other ways such as using protective covers that enclose individual battery packs of battery packs 122, protective means may be integrated into battery packs of battery packs 122, or protective cases may be omitted to minimize weight. In the example embodiment, battery packs 122 are cooled/heated by external liquid loops that transfer heat through the outside edges of battery packs 122. In the example embodiment, the liquid heating/cooling loops are permanently plumbed around the battery storage bay within vehicle 116. In other embodiments, individual liquid cooling/heating loops may be integrated internally within individual battery packs of battery packs 122 or the heating/cooling loop may be implemented as a single loop flowing through all of battery packs 122.

Server 110 includes trip data 112. In the example embodiment, server 110 may be a desktop computer, a notebook, a laptop computer, a tablet computer, a handheld device, a smart-phone, a thin client, or any other electronic device or computing system capable of receiving and sending data to and from other computing devices, such as computing device 102 and battery exchanger 114, via network 108. While server 110 is shown as a single device, in other embodiments, server 110 may be comprised of a cluster or plurality of computing devices, working together or working separately. Server 110 is described in more detail with reference to FIG. 3.

Trip data 112 is a database of information detailing maps, topographies, traffic conditions, news stories, weather conditions, and event information (shows, concerts, sporting events) from all over the world. In the example embodiment, trip data 112 is capable of accessing network 108 and is frequently updated to reflect the aforementioned information as accurately as possible.

Computing device 102 includes driving schedule 104 and intelligent optimizer program 106. In the example embodiment, computing device 102 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 102 is shown as a single device, in other embodiments, computing device 102 may be comprised of a cluster or plurality of computing devices, working together or working separately. Computing device 102 is described in more detail with reference to FIG. 3.

Driving schedule 104 includes information detailing the driving schedule of vehicle 116 and is input by the user of computing device 102 via a user interface. Driving schedule 104 of vehicle 116 includes information such as departure times, arrival times, departure dates, and arrival dates corresponding to vehicle 116. Furthermore, in the example embodiment, driving schedule 104 includes the load demand, which details the number of passengers and/or amount of cargo being taken on any of the routes included in driving schedule 104 (and may also include weight information of cargo and passengers). In the example embodiment, driving schedule 104 can be received in advance and be repeated on a daily, weekly, monthly or yearly basis. Driving schedule 104 can additionally receive the preferred route of the driver, if applicable, to and/or from any of the destinations designated in driving schedule 104.

In the example embodiment, intelligent optimizer program 106 is a software program capable of retrieving data, such as data contained in trip data 112, via network 108. Intelligent optimizer program 106 is capable of determining whether the user of computing device 102 has entered a preferred route, has selected an option to avoid toll booths, or stop for gas/coffee in driving schedule 104. Intelligent optimizer program 106 is additionally capable of determining and selecting the optimal route the driver of vehicle 116 should take to reach their destination in the shortest time possible by assessing information, such as route, event, and traffic information, referenced from trip data 112. Intelligent optimizer program 106 is capable of determining the required number of battery packs 122 necessary to provide sufficient power to reach and return from a destination designated in driving schedule 104. Furthermore, intelligent optimizer program 106 determines the optimal configuration of battery packs 122 in order to lower the center of gravity and maximize the handling of vehicle 116. Intelligent optimizer 106 is capable of transmitting information detailing the optimal battery pack load and configuration to battery exchanger 114 as well as assessing whether any unused batteries require charging. Intelligent optimizer program 106 is additionally capable of determining whether any unused batteries can be charged with alternative energies such as wind, solar, or hydroelectric power. Furthermore, intelligent optimizer program 106 is capable of determining whether any unused battery packs of battery packs 122 can be utilized in alternative battery applications such as household energy management or natural disaster energy supply.

Figure 2:
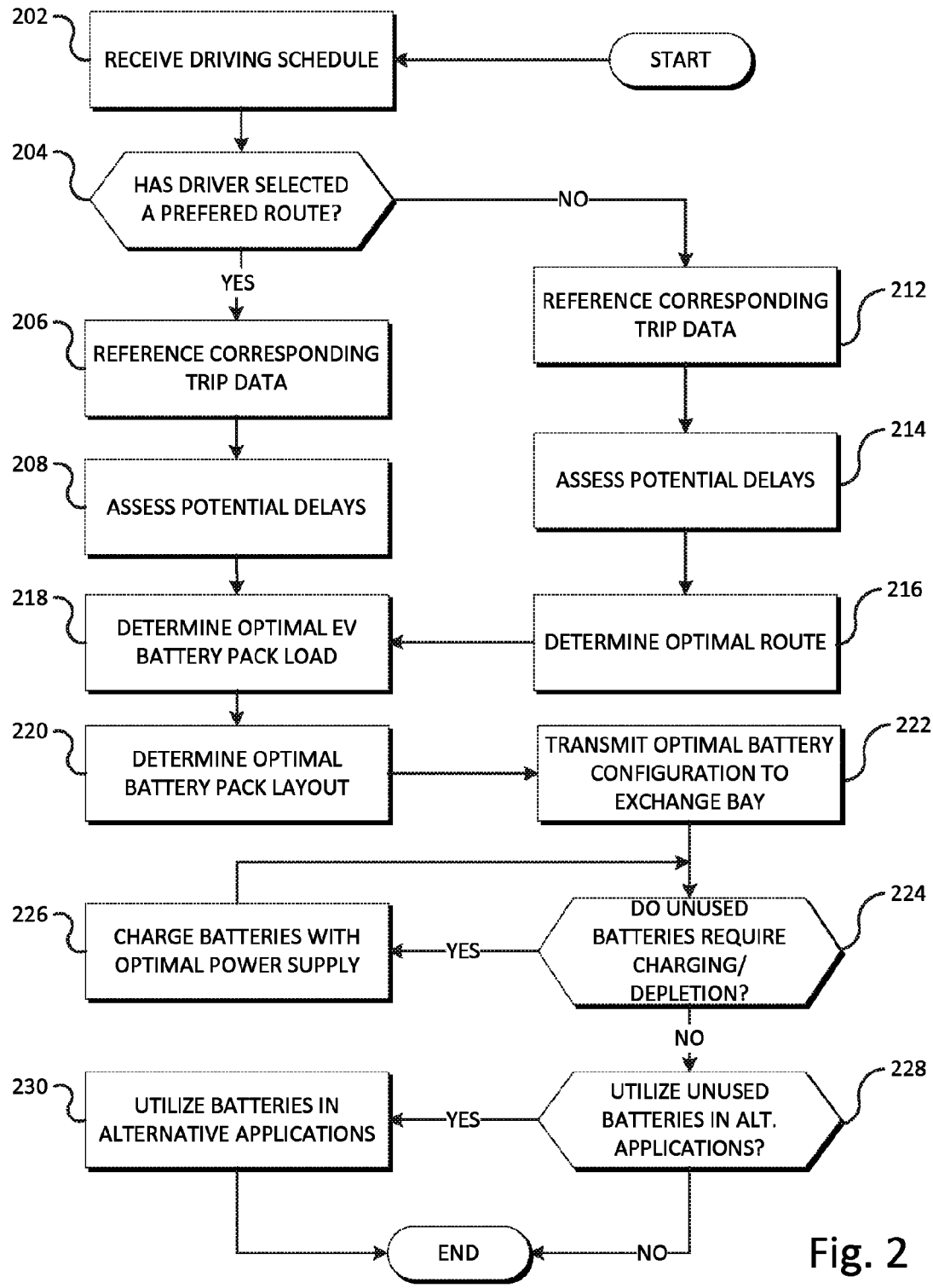
FIG. 2 is a flowchart illustrating the operations of the battery optimization program of FIG. 1 in determining the optimal battery load and configuration for a vehicle, in accordance with an embodiment of the invention.

FIG. 2 is a flowchart depicting the operation of intelligent optimizer program 106 in determining the optimal battery load and configuration for vehicle 116 to fulfill driving schedule 104 while minimizing weight and maximizing handling, in accordance with an embodiment of the present invention. In the example embodiment, intelligent optimizer program 106 receives driving schedule 104 via user input through a user interface on computing device 102 (step 202). In other embodiments, intelligent optimizer program 106 may receive driving schedule 104 via network 108. For example, if the user of computing device 102 intends to drive vehicle 116 to work and back every day during the week starting Monday, January $1^{st}$, lives in Westchester County, N.Y., and works from 9:00 AM to 5:00 PM approximately thirty (30) miles away in New York City (NYC), then the user inputs a home location in Westchester County, a work location in NYC, arrival times of 9:00 AM, and departure times of 5:00 PM for the dates of January $1^{st}$ through January $5^{th}$. In this example, intelligent optimizer program 106 receives the aforementioned driving schedule 104 via a user interface on device 102.

Intelligent optimizer program 106 determines whether the user of computing device 102 has entered a preferred route by determining whether the user of computing device 102 selected a selectable option indicating a preference to input a custom route into a user interface (decision 204). If the user has selected to enter a preferred route into the user interface (decision 204 "YES" branch), intelligent optimizer program 106 will defer to that route. Entering a preferred route starts by the user selecting a selectable option indicating that the user would prefer to input a custom route rather than intelligent optimizer program 106 automatically selecting the optimal route (intelligent optimizer program 106 selecting the optimal route is described in further detail in step 216). In the example embodiment, after the user indicates a preference for a custom route, intelligent optimizer program 106 provides the user with a default route between the scheduled starting location and destination that the user may drag and drop to the streets or highways the user prefers on the electronic map provided within the user interface of computing device 102. If the user is satisfied with the custom route they have input, the user selects a selectable option indicating that they would like to commute said route. Continuing the example above where the driver of vehicle 116 is driving to work in NYC, if the user prefers to take the scenic route along Saw Mill River Parkway South, the user may select the option within the user interface indicating the user prefers to take a custom route. Intelligent optimizer program 106 provides the user with a default route between Westchester County and NYC that the user may drag and drop onto the Saw Mill River Parkway South, then select an option indicating that the user is satisfied with the entered route.

If the user has indicated that they prefer a custom route (decision 204 "YES" branch), intelligent optimizer program 106 references trip data 112 in order to retrieve information corresponding to the preferred route (step 206). In the example embodiment where intelligent optimizer program

106 is connected to network 108, intelligent optimizer program 106 will reference information in trip data 112 via network 108. The retrieved data includes the mileage, traffic conditions, weather conditions, and other information that may affect the commute between locations designated within driving schedule 104. Continuing the example above in which a user is driving to work in NYC and prefers the scenic route along the Saw Mill River Parkway South, intelligent optimizer program 106 references trip data in order to retrieve the mileage, weather conditions, traffic conditions, stop light frequency, school bus activity, and other information relevant to the commute along the Saw Mill River Parkway South.

Intelligent optimizer program 106 assesses potential delays along the preferred route using the information retrieved in step 206 (step 208). The potential delays are assessed considering factors within the retrieved information such as traffic conditions, traffic accidents, school bus activity, weather conditions and any other information relevant to delays. This data is not only used to determine commute time, but also as a factor in determining how many battery packs of battery packs 122, in addition to the amount necessary to reach the destination and back, are required for the trip when delays are accounted for. For example, using the example above where the user prefers driving the scenic route to NYC along the Saw Mill River Parkway South, if the referenced information indicates that there is snow and heavy traffic along the route, intelligent optimizer program 106 may assess the snow and traffic delays to determine that the commute will take an additional fifteen (15) minutes and will automatically adjust the user's departure time and number of battery packs of battery packs 122 to load accordingly.

If a user has not indicated a preferred route in driving schedule 104 (decision 204 "NO" branch), intelligent optimizer program 106 will reference trip data 112 to determine several potential routes between the locations entered in driving schedule 104 (step 212). In the example embodiment, potential routes may include routes with the shortest commute, least mileage, least traffic, city/highway routes, and any other frequently used routes. In addition, intelligent optimizer program 106 will also reference information in trip data 112 for information corresponding to the potential routes, such as the mileage, traffic conditions, weather conditions, and other information that may affect the commute along the potential routes. Intelligent optimizer program 106 provides the user with selectable options which, when selected, indicate that the user would like to avoid tolls, stop for gas, or stop for coffee regardless of which route intelligent optimizer program 106 selects as optimal. Continuing the example above where the user is driving from home in Westchester County to work in NYC, if the user has not selected a preferred route, intelligent optimizer program 106 determines several potential routes and retrieves trip data corresponding to each route, including the Henry Hudson Parkway South (shortest commute time), I-87 South (least mileage), and Saw Mill River Parkway South (avoid highways).

Intelligent optimizer program 106 assesses delays along the potential routes using the information referenced in step 212 (step 214). Intelligent optimize assesses delays in the same manner as it does in step 208, except here intelligent optimizer program 106 assesses delays along each of the potential routes rather than along the preferred route. Continuing the example above where a user is driving from Westchester County to work in NYC, intelligent optimizer program assesses the delays along the potential routes and determines a delay of 10 minutes along the Henry Hudson Parkway South, 15 minutes along the I-87 South, and 25 minutes along Saw Mill River Parkway South.

In the example embodiment, intelligent optimizer program 106 determines and selects the optimal route based on the overall commute time, including anticipated delays (step 216). In other embodiments, however, intelligent optimizer program 106 may select the route with the least mileage, greatest estimated battery efficiency, or some other route distinguishing factor decided by the user. Referencing the aforementioned example where the user is driving to work in NYC, if intelligent optimizer program 106 determines that the total commute time along the Henry Hudson Parkway South is one hour, the total commute along I-87 South is one hour and fifteen minutes, and the total commute along the Saw Mill River Parkway is one and a half hours, intelligent optimizer program 106 will select the route along the Henry Hudson Parkway South totaling one hour of commute. In other embodiments, intelligent optimizer program 106 may determine an optimal route based on other factors such as avoiding tolls, avoiding areas that are associated with a high number of fines/tickets (based on information retrieved from a traffic violation database), and/or avoiding areas with high rates of criminal behavior.

Intelligent optimizer program 106 determines the optimal battery pack load required to power vehicle 116 to a destination and back, including any scheduled stops and anticipated delays (step 218). In determining the optimal battery pack load, intelligent optimizer program 106 takes into consideration travel distance before returning to battery exchanger 114, delays, load demand, temperature, elevation, battery pack weight, and other factors having an effect on the distance vehicle 116 can travel using battery power. In the example embodiment, an optional battery reserve charge of 20% is included, if available, in the event extra stops, unexpected delays, or detours are encountered. In other embodiments, the driver of vehicle 116 is free to allocate any percent battery reserve the user sees fit so long as the battery packs of battery packs 122 are available (i.e. the battery packs are not already in use or depleted). Continuing the example above where a user is driving to work in NYC and back, if intelligent optimizer program 106 determines that the commute of thirty (30) miles each way requires five (5) battery packs, intelligent optimizer program 106 will include an extra battery pack to account for unexpected delays, stops, or other events which prolong vehicle 116 returning to battery exchanger 114.

Intelligent optimizer program 106 determines the optimal configuration of the necessary battery packs of battery packs 122 within vehicle 116 (step 220). The optimal battery pack 122 configuration is based on the placement of battery packs 122 that results in a lowered center of gravity, maximized handling, improved safety, improved efficiency, and reduced wear on vehicle 116, such as placing battery packs 122 as low as possible or centered within vehicle 116. Furthermore, intelligent optimizer program 106 will consider weather conditions, such as taking into consideration slippery conditions and placing battery packs 122 above the driving wheels of vehicle 116 (front wheel drive, rear wheel drive, all-wheel drive, etc.) to increase traction. In the example embodiment where battery packs 122 within vehicle 116 are protected from the top and bottom by protective covers, battery exchanger 114 utilizes a robotic arm to remove the bottom mounted protective cover and add, remove, or exchange the battery packs to the configuration specified by intelligent optimizer program 106. Continuing the example above where the user is driving vehicle 116 to work in NYC, if there is snow along the selected route, intelligent optimizer program 106 may configure battery packs 122 in an orientation based on the aforementioned factors, such as placing battery packs 122 over the front wheels of the front wheel drive vehicle 116.

In the example embodiment where intelligent optimizer program 106 and battery exchanger 114 are connected via network 108, intelligent optimizer program 106 transmits the optimal battery configuration, both load and configuration, to battery exchanger 114 via network 108 (step 222). In other embodiments where intelligent optimizer program 106 and battery exchanger 114 are not connected via network 108, intelligent optimizer program 106 transmits the optimal battery configuration to battery exchanger 114 via a wired connection. After receiving the transmission detailing the optimal load and configuration from intelligent optimizer program 106, battery exchanger 114 loads the necessary battery packs of battery packs 122 into vehicle 116 using a robotic arm in the optimal configuration. Illustrating the aforementioned example where the user is driving to work in NYC, if conditions are not slippery, intelligent optimizer program 106 may configure the necessary battery packs of battery packs 122 in order to increase handling, such as spread out uniformly close to the ground.

Having allocated the necessary battery packs of battery packs 122 to fulfill the immediate trips of driving schedule 112, intelligent optimizer program 106 determines whether unused battery packs of battery packs 122, if any, require charging/depletion (decision 224). In the example embodiment, intelligent optimizer program 106 determines whether unused battery packs of battery packs 122 require charging via communication with battery exchanger 114 via network 108. Battery exchanger 114 monitors the charge levels of battery packs 122 periodically and transmits them back to intelligent optimizer program 106. In determining whether battery packs 122 require charging or depletion, intelligent optimizer program 106 considers the remaining charge left in battery packs 122, proper battery cycle depletion management, and future commutes indicated in driving schedule 104. In the above example where the user is driving to work in NYC, suppose the user is driving approximately 160 miles to Atlantic City, N.J. later that night and the remaining unused battery packs of battery packs 122 are charged to 50% capacity. Although the unused battery packs of battery packs 122 do not require charging based on the remaining charge (assume 50% is above the threshold to require recharging) and despite proper battery cycle management encouraging full depletion prior to recharging, unused battery packs of battery packs 122 will be charged nonetheless in anticipation of the long distance trip scheduled for later that night after work.

If intelligent optimizer program 106 determines unused battery packs of battery packs 122 require charging (decision 224 "YES" branch), intelligent optimizer program 106 determines the optimal power source for charging (step 226). In determining the optimal charging power supply, intelligent optimizer program 106 considers the proximity to the next scheduled trip indicated by driving schedule 104, grid charging costs based on hour of the day, alternative charging sources such as wind and solar power (and their respective costs), and other factors in reducing the cost of recharging battery packs 122. If driving schedule 104 indicates that vehicle 116 is scheduled to drive within the near future, such as after work, intelligent optimizer program 106 ensures unused battery packs of battery packs 122 are charged for the trip using the most preferred available power source (priority of power sources may be set by the user). Continuing the example above where a user is driving to work in NYC, if the user does not have any near-future trips scheduled according to driving schedule 104, intelligent optimizer program 106 will defer charging unused battery packs of battery packs 122 until a priority power supply at the most cost effective time is available, such as during the day via solar power or at night during off-peak hour grid supply. Conversely, if the user has a near future trip scheduled, unused battery packs of battery packs 122 will be charged immediately with the most preferred power source available.

If the unused battery packs of battery packs 122 do not require charging (decision 224 "NO" branch), intelligent optimizer program 106 determines whether the unused battery packs of battery packs 122 can be utilized in alternative applications, such as powering home appliances or storing excess solar power (decision 228). Intelligent optimizer program 106 determines whether unused battery packs of battery packs 122 can be utilized in alternative applications by assessing the capabilities and needs of the home which are input by the user, such as supplemental heat, supplemental power, power storage, or mobile power.

If intelligent optimizer program 106 determines there is a need for unused battery packs of battery packs 122 in a listed capability of the home (decision 228 "YES" branch), unused battery packs of battery packs 122 may be implemented in one of the alternative applications, such as powering critical household appliances in a power outage (such as a refrigerator), heating/cooling systems, lighting, rechargeable devices, or other household needs requiring electricity (step 230). Additionally, alternative applications may include storing excess energies, such as grid, solar, hydroelectric, geothermal, and wind energy.

If intelligent optimizer program 106 determines that there is not a need for unused battery packs of battery packs 122 in a listed capability of the home (decision 228 "NO" branch), intelligent optimizer program 106 will continue to receive the charge level of unused battery pack of battery packs 122 from battery exchanger 114 while storing them for future use.

Figure 3:
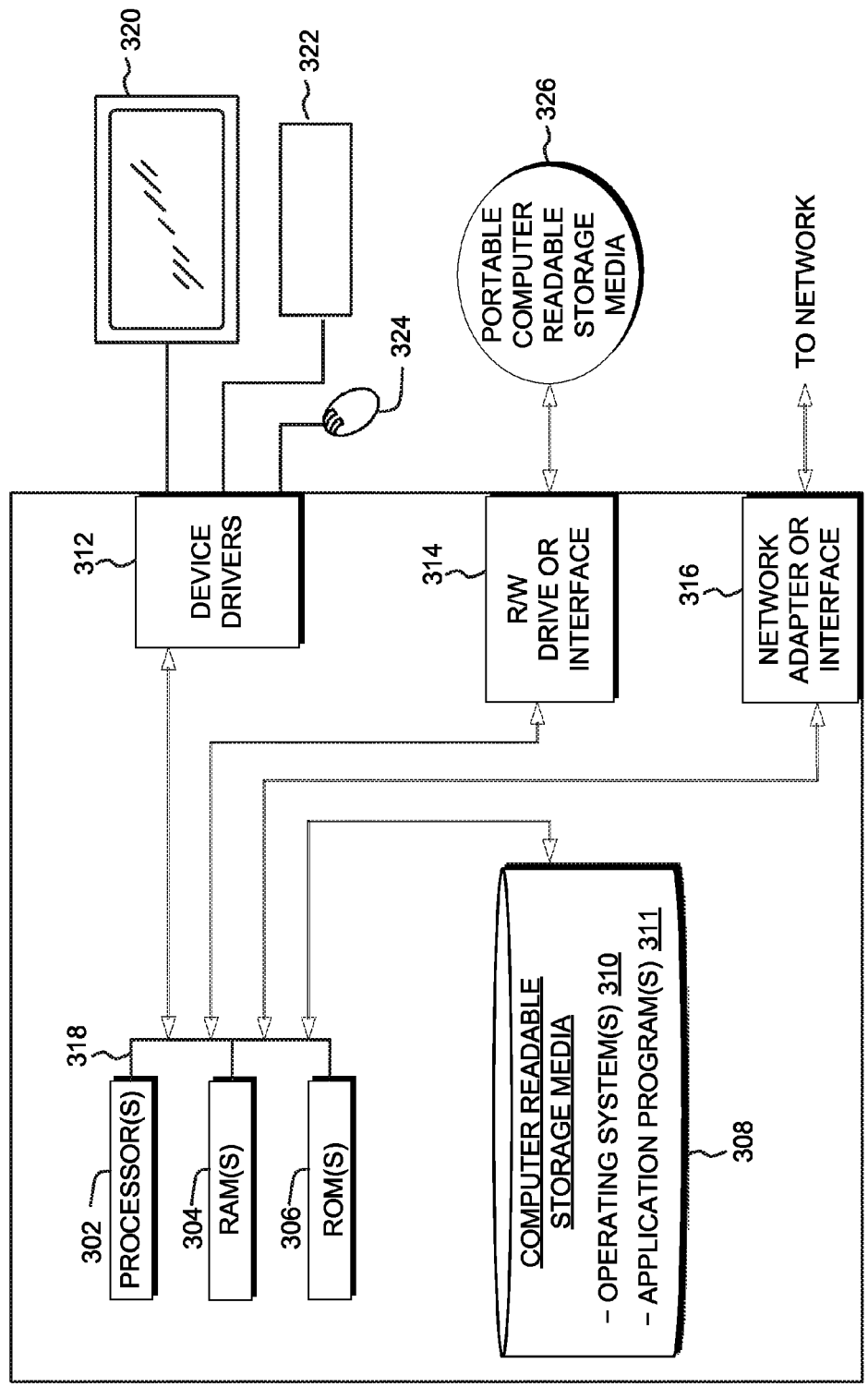
FIG. 3 is a block diagram depicting the hardware components of a battery optimization system of FIG. 1, in accordance with an embodiment of the invention.

FIG. 3 depicts a block diagram of components of computing device 102 of a battery optimization system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 102 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, intelligent optimizer program 106, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 102 may also include a R/W drive or interface 314 to read from and write to one or more portable computer readable storage media 326. Application programs 311 on computing device 102 may be stored on one or more of the portable computer readable storage media 326, read via the respective R/W drive or interface 314 and loaded into the respective computer readable storage media 308.

Computing device 102 may also include a network adapter or interface 316, such as a TCP/IP adapter card or wireless communication adapter (such as a 4G wireless communication adapter using OFDMA technology). Application programs 311 on computing device 102 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 102 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for battery optimization, the method comprising:
    receiving, by a computer, a driving schedule corresponding to a driver of a vehicle, wherein the vehicle is powered by battery packs;
    identifying, by the computer, one or more routes between one or more locations designated in the driving schedule;
    retrieving, by the computer, trip data corresponding to the one or more routes, wherein the trip data includes at least any delays along the one or more routes;
    determining, by the computer, an optimal route from the one or more routes based on the trip data;
    determining, by the computer, a minimum number of battery packs required to power the vehicle based on the determined optimal route;
    determining, by the computer, an optimal configuration in which to physically position the minimum number of batteries packs within the vehicle, wherein the optimal configuration is based, at least in part, on increasing an efficiency of the vehicle, reducing a center of gravity of the vehicle, increasing tire traction of the vehicle, increasing safety of the vehicle, and reducing wear on the vehicle; and
    transmitting, by the computer, the minimum number of battery packs and the optimal configuration of the minimum number of battery packs to a battery exchanger, wherein the battery exchanger is capable of adding and removing one or more battery packs to and from the vehicle.

2. The method of claim 1, wherein the driving schedule includes one or more dates, one or more times, and one or more locations corresponding to where and when the driver will drive the vehicle.

3. The method of claim 1, wherein the trip data includes information such as mileage, traffic conditions, and weather conditions corresponding to the driving schedule.

4. The method of claim 1, wherein the one or more routes may include a driver preferred route entered by the driver.

5. The method of claim 1, wherein the battery packs are charged by the battery exchanger using a plurality of power sources.

6. A computer program product for battery optimization, the computer program product comprising:
    one or more computer-readable non-transitory storage media and program instructions stored on the one or more computer-readable storage media, the program instructions comprising:
    program instructions to receive a driving schedule corresponding to a driver of a vehicle, wherein the vehicle is powered by battery packs;
    program instructions to identify one or more routes between one or more locations designated in the driving schedule;
    program instructions to retrieve trip data corresponding to the one or more routes, wherein the trip data includes at least any delays along the one or more routes;
    program instructions to determine an optimal route from the one or more routes based on the trip data;
    program instructions to determine a minimum number of battery packs required to power the vehicle based on the determined optimal route;
    program instructions to determine an optimal configuration in which to physically position the minimum number of battery packs within the vehicle, wherein the optimal configuration is based, at least in part, on increasing an efficiency of the vehicle, reducing a center of gravity of the vehicle, increasing tire traction of the vehicle, increasing safety of the vehicle, and reducing wear on the vehicle; and
    program instructions to transmit the minimum number of battery packs and the optimal configuration of the minimum number of battery packs to a battery exchanger, wherein the battery exchanger is capable of adding and removing one or more battery packs to and from the vehicle.

7. The computer program product of claim 6, wherein the driving schedule includes one or more dates, one or more times, and one or more locations corresponding to where and when the driver will drive the vehicle.

8. The computer program product of claim 6, wherein the trip data includes information such as mileage, traffic conditions, and weather conditions corresponding to the driving schedule.

9. The computer program product of claim 6, wherein the one or more routes may include a driver preferred route entered by the driver.

10. The computer program product of claim 6, wherein the battery packs are charged by the batter exchanger using a plurality of power sources.

11. A computer system for battery optimization, the computer system comprising:
   one or more computer processors, one or more computer-readable non-transitory storage media, and program instructions stored on one or more of the computer-readable storage media for execution by at least one of the one or more processors, the program instructions comprising:
   program instructions to receive a driving schedule corresponding to a driver of a vehicle, wherein the vehicle is powered by battery packs;
   program instructions to identify one or more routes between one or more locations designated in the driving schedule;
   program instructions to retrieve trip data corresponding to the one or more routes, wherein the trip data includes at least any delays along the one or more routes;
   program instructions to determine an optimal route from the one or more routes based on the trip data;
   program instructions to determine a minimum number of battery packs required to power the vehicle based on the determined optimal route;
   program instructions to determine an optimal configuration in which to physically position the minimum number of battery packs within the vehicle, wherein the optimal configuration is based, at least in part, on increasing an efficiency of the vehicle, reducing a center of gravity of the vehicle, increasing tire traction of the vehicle, increasing safety of the vehicle, and reducing wear on the vehicle; and
   program instructions to transmit the minimum number of battery packs and the optimal configuration of the minimum number of battery packs to a battery exchanger, wherein the battery exchanger is capable of adding and removing one or more battery packs to and from the vehicle.

12. The computer system of claim 11, wherein the driving schedule includes one or more dates, one or more times, and one or more locations corresponding to where and when the driver will drive the vehicle.

13. The computer system of claim 11, wherein the trip data includes information such as mileage, traffic conditions, and weather conditions corresponding to the driving schedule.

14. The computer system of claim 11, wherein the one or more routes may include a driver preferred route entered by the driver.

15. The computer system of claim 11, wherein the battery packs are charged by the batter exchanger using a plurality of power sources.

* * * * *